United States Patent
Hashimoto et al.

(10) Patent No.: US 10,738,664 B2
(45) Date of Patent: Aug. 11, 2020

(54) OIL SUPPLY DEVICE FOR ENGINE

(71) Applicant: MAZDA MOTOR CORPORATION, Hiroshima (JP)

(72) Inventors: Masanori Hashimoto, Hiroshima (JP); Hisashi Okazawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 897 days.

(21) Appl. No.: 15/391,200

(22) Filed: Dec. 27, 2016

(65) Prior Publication Data

US 2017/0211431 A1   Jul. 27, 2017

(30) Foreign Application Priority Data

Jan. 21, 2016  (JP) .................... 2016-009412

(51) Int. Cl.
    *F01L 1/344*  (2006.01)
    *F01L 13/00*  (2006.01)
    (Continued)

(52) U.S. Cl.
    CPC .......... *F01L 1/3442* (2013.01); *F01L 1/2405* (2013.01); *F01L 9/02* (2013.01); *F01L 13/0005* (2013.01);
    (Continued)

(58) Field of Classification Search
    CPC .......... F01L 1/3442; F01L 2001/34423; F01L 2001/34426; F01L 2001/3443;
    (Continued)

(56) References Cited

U.S. PATENT DOCUMENTS

| 4,998,449 A | 3/1991 | Baba et al. |
| 8,985,073 B2 | 3/2015 | Kanai |

(Continued)

FOREIGN PATENT DOCUMENTS

| CN | 102102557 A | 6/2011 |
| CN | 203551257 U | 4/2014 |

(Continued)

OTHER PUBLICATIONS

An Office Action issued by the Japanese Patent Office dated Dec. 20, 2017, which corresponds to Japanese Patent Application No. 2016-009412 and is related to U.S. Appl. No. 15/391,200; with English translation.

An Office Action mailed by the State Intellectual Property Office of the People's Republic of China dated Nov. 27, 2018, which corresponds to Chinese Patent Application No. 201710037332.0 and is related to U.S. Appl. No. 15/391,200.

*Primary Examiner* — Mark A Laurenzi
*Assistant Examiner* — Loren C Edwards
(74) *Attorney, Agent, or Firm* — Studebaker & Brackett PC

(57) ABSTRACT

A controller sets a target hydraulic pressure from a required hydraulic pressure of a hydraulically operated device according to an operating condition of an engine. The controller causes an oil control valve to perform feedback control of the discharge amount of an oil pump in such a manner that an actual hydraulic pressure detected by a hydraulic pressure sensor coincides with the target hydraulic pressure. The controller executes feedback control after executing fixed duty control of setting a duty ratio of the oil control valve to a fixed duty ratio for a predetermined period of time from start of the engine.

4 Claims, 11 Drawing Sheets

(51) Int. Cl.

| | |
|---|---|
| *F01L 1/24* | (2006.01) |
| *F01M 11/10* | (2006.01) |
| *F01L 9/02* | (2006.01) |
| *F01M 1/02* | (2006.01) |
| *F01M 1/16* | (2006.01) |
| *F02F 7/00* | (2006.01) |
| *F01L 1/18* | (2006.01) |
| *F01L 1/053* | (2006.01) |

(52) U.S. Cl.
CPC ............. *F01M 1/02* (2013.01); *F01M 1/16* (2013.01); *F01M 11/10* (2013.01); *F01L 1/185* (2013.01); *F01L 2001/0537* (2013.01); *F01L 2001/3443* (2013.01); *F01L 2001/34423* (2013.01); *F01L 2001/34426* (2013.01); *F01L 2105/00* (2013.01); *F01L 2250/02* (2013.01); *F01L 2250/04* (2013.01); *F01L 2800/01* (2013.01); *F01L 2810/02* (2013.01); *F02F 7/0053* (2013.01); *F16N 2250/36* (2013.01)

(58) Field of Classification Search
CPC ....... F01L 1/2405; F01L 9/02; F01L 13/0005; F01L 2810/02; F01M 1/02; F01M 1/16; F01M 11/10; F02F 7/0053; F16N 2250/36
USPC .................................................... 123/90.12
See application file for complete search history.

(56) References Cited

U.S. PATENT DOCUMENTS

| | | | |
|---|---|---|---|
| 2011/0146602 A1* | 6/2011 | Kato | F01L 1/3442 123/90.12 |
| 2011/0194967 A1 | 8/2011 | Watanabe et al. | |
| 2016/0010519 A1* | 1/2016 | Hashimoto | F01M 1/16 184/6.1 |

FOREIGN PATENT DOCUMENTS

| | | |
|---|---|---|
| CN | 105189950 A | 12/2015 |
| CN | 204900376 U | 12/2015 |
| DE | 102004048070 A1 | 6/2006 |
| JP | 2006-275199 A | 10/2006 |
| JP | 2009-014640 A | 1/2009 |
| JP | 2011-163194 A | 8/2011 |
| JP | 5168372 B2 | 3/2013 |
| JP | 5270525 B2 | 8/2013 |
| JP | 5321149 B2 | 10/2013 |
| JP | 5565323 B2 | 8/2014 |
| JP | 2014-199011 A1 | 10/2014 |
| JP | 2016-011594 A | 1/2016 |
| JP | 2017-031938 A | 2/2017 |

* cited by examiner

FIG. 10

| OIL TEMPERATURE | −40 | −30 | −20 | −10 | 0 |
|---|---|---|---|---|---|
| FIXED DUTY RATIO | D0 | D1 | D2 | D3 | D4 |

T101

| OIL TEMPERATURE | −40 | −30 | −20 | −10 | 0 |
|---|---|---|---|---|---|
| TIME DURATION | T0 | T1 | T2 | T3 | T4 |

| OPERATING CONDITION | ROTATIONAL SPEED | LOAD | OIL TEMPERATURE | 500 | 1000 | 1500 | 2000 | 3000 | 4000 | 5000 | 6000 |
|---|---|---|---|---|---|---|---|---|---|---|---|
| — | — | — | Tc1 | 35 | 45 | 65 | 85 | 130 | 150 | 150 | 150 |
| | | | Tc2 | | | 80 | 100 | 150 | 170 | 170 | 170 |
| | | | Tc3 | | | 110 | 130 | 170 | 200 | 200 | 200 |

T601

OIL SUPPLY DEVICE FOR ENGINE

FIELD OF THE INVENTION

The present invention relates to an oil supply device for an engine.

BACKGROUND ART

Conventionally, there is known an oil supply device for supplying oil to various parts of an engine.

Japanese Patent No. 5,168,372 discloses a technique, in which the amount of oil to be supplied to bearing portions such as a crank bearing is regulated by a flow rate adjustment valve in such a manner that the oil pressure of a variable valve train mechanism reaches a target pressure or more when an engine is started to secure operability of the variable valve train mechanism from start of the engine.

Japanese Unexamined Patent Publication No. 2014-199011 discloses a technique, in which a plurality of hydraulically operated devices (hydraulic VVT mechanisms and valve stop devices) are provided, a maximum required hydraulic pressure out of the required hydraulic pressures of the hydraulically operated devices is set as a target hydraulic pressure according to an operating condition of an engine, and the discharge amount of a variable capacity oil pump is controlled by an oil control valve in such a manner that an actual hydraulic pressure coincides with the set target hydraulic pressure.

When an engine is started in a cold state, an oil pump is operated in a state that the oil viscosity is high. Therefore, oil may not be supplied to the entirety of an oil supply passage. As a result, a situation occurs such that oil is sufficiently supplied to a main gallery where a hydraulic pressure sensor is provided, and an excessively large actual hydraulic pressure is detected by the hydraulic pressure sensor regardless that oil is not sufficiently supplied to a pressure chamber of an oil pump provided on an oil supply passage downstream of the main gallery.

In this case, even when an oil control valve is controlled in such a manner as to lower the actual hydraulic pressure to a target hydraulic pressure by feedback control, oil may not be sufficiently supplied to the pressure chamber. As a result, the oil pump may fail to adjust the discharge amount of oil, and may be incapable of lowering the actual hydraulic pressure. Consequently, the control amount of the oil pump for lowering the actual hydraulic pressure may further increase.

Eventually, a sufficient amount of oil is supplied to the pressure chamber, and the oil pump is brought to a state in which the discharge amount is adjustable. However, in this case, the control amount of the oil pump for lowering the actual hydraulic pressure is excessively large. As a result, the actual hydraulic pressure may be sharply lowered below the target hydraulic pressure, and the discharge amount of the oil pump may excessively decrease.

The amount of oil to be supplied to the pressure chamber depends on the discharge amount of the oil pump. Therefore, when the discharge amount of the oil pump excessively decreases, a sufficient amount of oil may not be supplied to the pressure chamber, and the oil pump may be brought to a state in which the discharge amount is not adjustable. In this case, even when the oil control valve is controlled to raise the excessively low actual hydraulic pressure to the target hydraulic pressure, the actual hydraulic pressure may not easily rise to the target hydraulic pressure. As a result, the control amount of the oil pump for raising the actual hydraulic pressure may increase. Eventually, the oil pump is brought to a state in which the discharge amount is adjustable. However, in this case, the control amount of the oil pump for raising the actual hydraulic pressure is excessively large. Therefore, the actual hydraulic pressure may sharply increase.

As described above, when feedback control is applied when an engine is started in a cold state, hunting by the actual hydraulic pressure may increase, and a long time may be required until the actual hydraulic pressure reaches the target hydraulic pressure. As a result, it may be impossible to perform stable control of a hydraulically operated device such as a hydraulic VVT mechanism in an early stage.

Further, both of Japanese Patent No. 5,168,372 and Japanese Unexamined Patent Publication No. 2014-199011 are made based on the premise that feedback control is performed. Therefore, it may be impossible to solve the aforementioned drawbacks when an engine is started in a cold state.

SUMMARY OF THE INVENTION

In view of the above, an object of the present invention is to provide an oil supply device for an engine, which enables to shorten a period of time required until an actual hydraulic pressure reaches a target hydraulic pressure, and to perform stable control of a hydraulically operated device in an early stage.

An oil supply device for an engine according to an aspect of the present invention includes a variable capacity oil pump; a hydraulically operated device connected to the oil pump via an oil supply passage; a hydraulic pressure detection device which detects a hydraulic pressure of the oil supply passage; an oil control valve which controls a flow rate of oil to be supplied to a pressure chamber of the oil pump to change a discharge amount of oil to be discharged from the oil pump; and a control device which sets a target hydraulic pressure from a required hydraulic pressure of the hydraulically operated device according to an operating condition of the engine, and causes the oil control valve to perform feedback control of the discharge amount of the oil pump in such a manner that an actual hydraulic pressure detected by the hydraulic pressure detection device coincides with the target hydraulic pressure. The control device executes the feedback control after executing fixed value control of setting a control value of the oil control valve to a fixed control value during a predetermined period of time from start of the engine.

According to the present invention, it is possible to speedily cause an actual hydraulic pressure to reach a target hydraulic pressure when an engine is started in a cold state in which the oil viscosity is high, and to perform stable control of a hydraulically operated device in an early stage.

These and other objects, features and advantages of the present invention will become more apparent upon reading the following detailed description along with the accompanying drawings.

BRIEF DESCRIPTION OF THE DRAWINGS

FIG. 10 is a diagram, in which an upper diagram illustrates an example of a fixed duty ratio table, and a lower diagram illustrates a time duration table; and FIG. 11 is a diagram illustrating an example of a required hydraulic pressure table indicating required hydraulic pressures of an exhaust VVT mechanism.

DESCRIPTION OF EMBODIMENTS

In the following, an exemplary embodiment is described in detail on the basis of the drawings.

Figure 1:
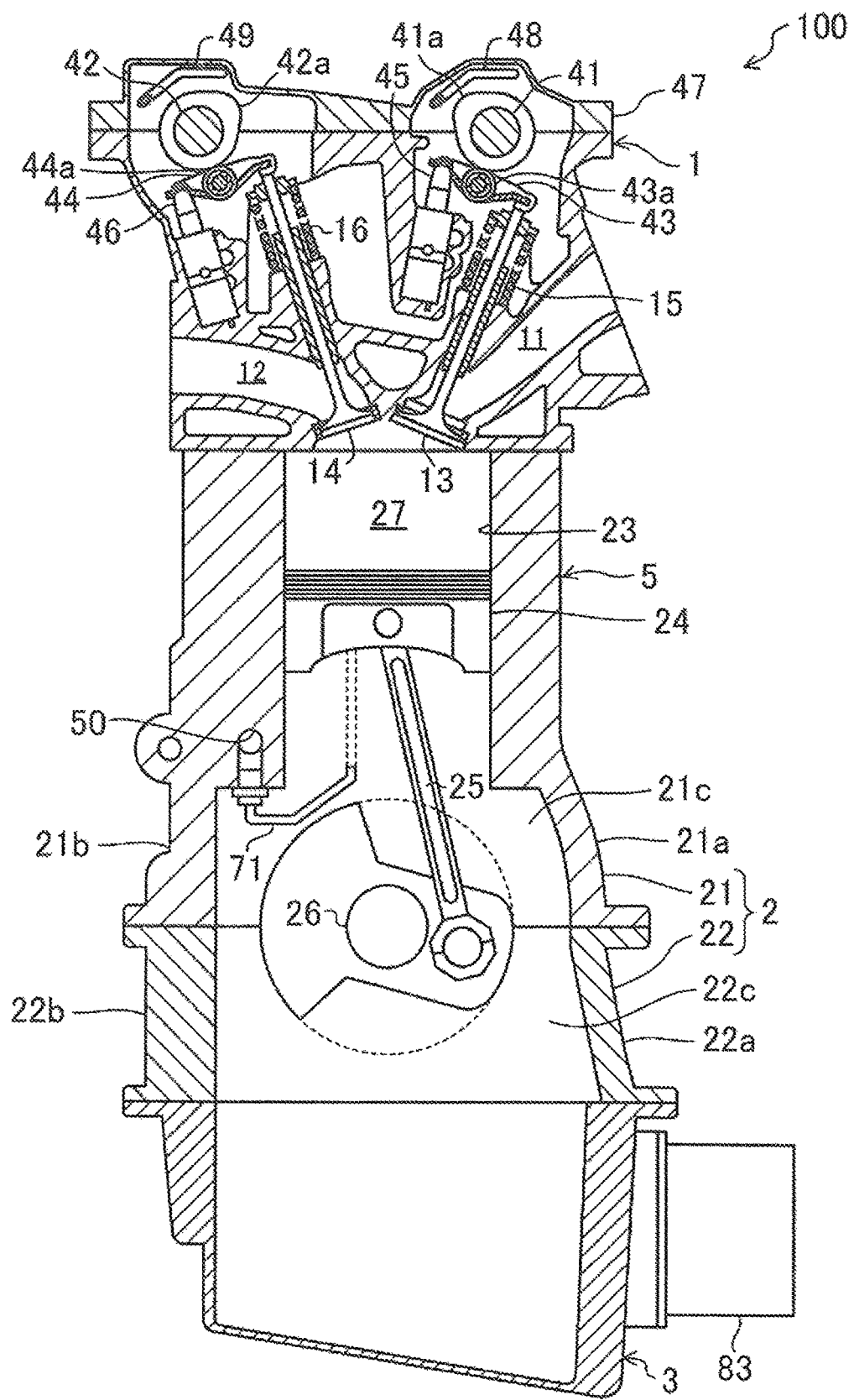
FIG. 1 is a schematic sectional view of an engine taken along a plane including an axis of a cylinder.

FIG. 1 is a schematic sectional view of an engine 100 taken along a plane including an axis of a cylinder. In the present specification, for the convenience of explanation, the axis direction of a cylinder is referred to as an up-down direction, and the cylinder array direction is referred to as a front-rear direction. Further, the side of the engine 100 opposite to a transmission in the cylinder array direction is referred to as a front side, and the transmission side is referred to as a rear side.

The engine 100 is an in-line 4-cylinder engine configured such that four cylinders are aligned in a predetermined cylinder array direction. The engine 100 includes a cylinder head 1, a cylinder block 2 mounted on the cylinder head 1, and an oil pan 3 mounted on the cylinder block 2.

The cylinder block 2 includes an upper block 21 and a lower block 22. The lower block 22 is mounted on the lower surface of the upper block 21. The oil pan 3 is mounted on the lower surface of the lower block 22.

Four cylinder bores 23 corresponding to the four cylinders are formed in the upper block 21 in the cylinder array direction. In FIG. 1, only one cylinder bore 23 is illustrated. The cylinder bores 23 are formed in the upper portion of the upper block 21. The lower portion of the upper block 21 defines a part of a crank chamber. Pistons 24 are disposed in the cylinder bores 23. The pistons 24 are connected to a crankshaft 26 via connecting rods 25. Combustion chambers 27 are defined by the cylinder bores 23, the pistons 24, and the cylinder head 1. Note that the four cylinder bores 23 correspond to the first cylinder, the second cylinder, the third cylinder, and the fourth cylinder in this order from the front side.

Intake ports 11 and exhaust ports 12 opened to the combustion chambers 27 are formed in the cylinder head 1.

Intake valves 13 for opening and closing the intake ports 11 are formed in the intake ports 11. Exhaust valves 14 for opening and closing the exhaust ports 12 are formed in the exhaust ports 12. The intake valves 13 and the exhaust valves 14 are respectively driven by cam portions 41a and 42a formed on camshafts 41 and 42.

Specifically, an intake valve 13 and an exhaust valve 14 are urged in a closing direction (in the upward direction in FIG. 1) by valve springs 15 and 16. Swing arms 43 and 44 are respectively interposed between the intake valve 13 and the cam portion 41a, and between the exhaust valve 14 and the cam portion 42a. Ends of the swing arms 43 and 44 are respectively supported by hydraulic lash adjusters 45 and 46 (hereinafter, referred to as HLAs 45 and 46). The swing arms 43 and 44 swing around ends thereof supported by the HLAs 45 and 46 when cam followers 43a and 44a provided at the substantially middle portions of the swing arms 43 and 44 are respectively pushed by the cam portions 41a and 42a. When the swing arms 43 and 44 swing as described above, the intake valve 13 and the exhaust valve 14 are respectively moved by the other ends of the swing arms 43 and 44 in an opening direction (in the downward direction in FIG. 1) against the urging forces of the valve springs 15 and 16. The HLAs 45 and 46 automatically adjust the valve clearance to zero by a hydraulic pressure.

Note that the HLAs 45 and 46 provided in each of the first cylinder and the fourth cylinder respectively include valve stop devices which stop operations of the intake valve 13 and the exhaust valve 14. In the following, HLAs 45 and 46 including a valve stop device are referred to as HLAs 45a and 46b, and HLAs 45 and 46 without a valve stop device are referred to as HLAs 45b and 46b on the basis of the presence or absence of a valve stop device. The engine 100 operates all the intake valves 13 and the exhaust valves 14 of the first to fourth cylinders when the engine 100 is in an all-cylinder operation. On the other hand, the engine 100 stops operations of the intake valves 13 and the exhaust valves 14 of the first cylinder and the fourth cylinder, and operates the intake valves 13 and the exhaust valves 14 of the second cylinder and the third cylinder when the engine 100 is in a reduced-cylinder operation.

Mounting holes for mounting the HLAs 45a and 46a are formed in portions of the cylinder head 1 at positions associated with the first cylinder and the fourth cylinder. The HLAs 45a and 46a are mounted in the mounting holes. An oil supply passage communicating with the mounting holes is formed in the cylinder head 1. Oil is supplied to the HLAs 45a and 46a through the oil supply passage.

A cam cap 47 is mounted on the top portion of the cylinder head 1. The camshafts 41 and 42 are rotatably supported on the cylinder head 1 and the cam cap 47.

An intake oil shower 48 is provided above the intake camshaft 41, and an exhaust oil shower 49 is provided above the exhaust camshaft 42. The intake oil shower 48 and the exhaust oil shower 49 are configured such that oil is allowed to drop to contact portions between the cam portions 41a and 42a, and the cam followers 43a and 44a of the swing arms 43 and 44.

Further, the engine 100 includes a variable valve timing mechanism (hereinafter, referred to as a VVT mechanism) which changes valve characteristics of each of the intake valves 13 and the exhaust valves 14. An intake VVT mechanism is electrically operated, and an exhaust VVT mechanism 18 is hydraulically operated.

The upper block 21 includes a first side wall 21a located on the intake side with respect to the four cylinder bores 23, a second side wall 21b located on the exhaust side with respect to the four cylinder bores 23, a front wall (not illustrated) located on the front side than the frontmost cylinder bore 23, a rear wall (not illustrated) located on the rear side than the rearmost cylinder bore 23, and a plurality of vertical walls 21*c* extending in the up-down direction in a region between each two adjacent cylinder bores 23.

The lower block 22 includes a first side wall 22*a* associated with the first side wall 21*a* of the upper block 21 and located on the intake side, a second side wall 22*b* associated with the second side wall 21*b* of the upper block 21 and located on the exhaust side, a front wall (not illustrated) associated with the front wall of the upper block 21 and located on the front side, a rear wall (not illustrated) associated with the rear wall of the upper block 21 and located on the rear side, and a plurality of vertical walls 22*c* associated with the vertical walls 21*c* of the upper block 21. The upper block 21 and the lower block 22 are engaged with each other by bolts.

A bearing portion 28 (see FIG. 2) for supporting the crankshaft 26 is provided each between the front wall of the upper block 21 and the front wall of the lower block 22, between the rear wall of the upper block 21 and the rear wall of the lower block 22, and between the vertical walls 21*c* and the vertical walls 22*c*.

Figure 2:
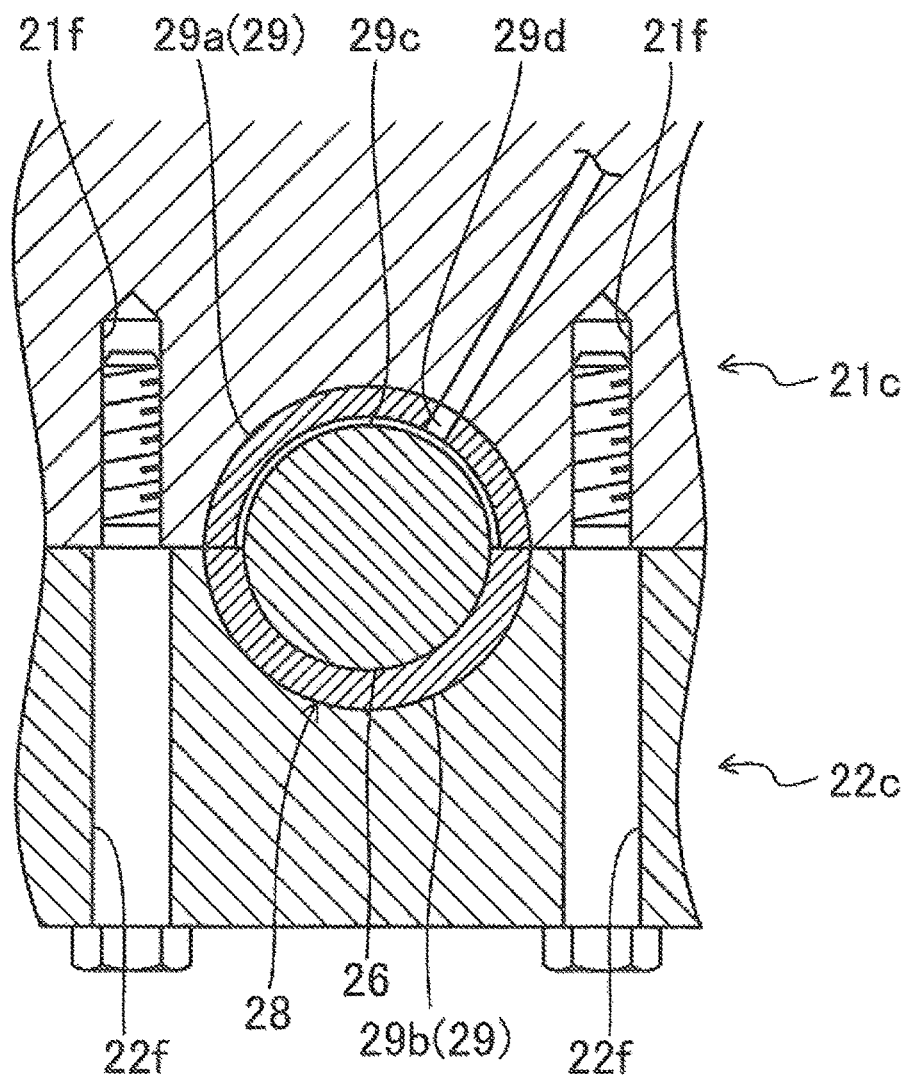
FIG. 2 is a longitudinal sectional view of a crankshaft.

In the following, one of the bearing portions 28 between the vertical walls 21*c* and the vertical walls 22*c* is described referring to FIG. 2. FIG. 2 is a sectional view of the vertical wall 21*c* of the upper block 21, and the vertical wall 22*c* of the lower block 22 located at the middle in the cylinder array direction. Note that the bearing portions 28 are also provided between the front wall of the upper block 21 and the front wall of the lower block 22, and between the rear wall of the upper block 21 and the rear wall of the lower block 22. When these bearing portions 28 are distinguished one from another, the bearing portions 28 are respectively referred to as a first bearing portion 28A, a second bearing portion 28B, a third bearing portion 28C, a fourth bearing portion 28D, and a fifth bearing portion 28E in this order from the front side.

Each of the bearing portions 28 is disposed between two bolt engaging portions. Specifically, the bearing portion 28 is disposed between a pair of screw holes 21*f* and a pair of bolt insertion holes 22*f*. The bearing portion 28 includes a tubular bearing metal 29. A semi-circular cutout portion is formed in a joint portion of each of the vertical wall 21*c* and the vertical wall 22*c*. The bearing metal 29 has a two-part structure constituted by a first semi-circular portion 29*a* and a second semi-circular portion 29*b*. The first semi-circular portion 29*a* is mounted in the cutout portion of the vertical wall 21*c*, and the second semi-circular portion 29*b* is mounted in the cutout portion of the vertical wall 22*c*. Joining the vertical wall 21*c* and the vertical wall 22*c* makes it possible to join the first semi-circular portion 29*a* and the second semi-circular portion 29*b* into a tubular shape. An oil groove 29*c* extending in a semi-circumferential direction is formed in the inner surface of the first semi-circular portion 29*a*. In addition to the above, a communication passage 29*d* including an end thereof opened to the outer surface of the first semi-circular portion 29*a*, and including the other end thereof opened to the oil groove 29*c* passes through the first semi-circular portion 29*a*. An oil supply passage is formed in the upper block 21. Oil is supplied to the outer surface of the first semi-circular portion 29*a* via the oil supply passage. The communication passage 29*d* is disposed at a position to communicate with the oil supply passage. This configuration allows for the oil supplied from the oil supply passage to flow into the oil groove 29*c* via the communication passage 29*d*.

Although the illustration is omitted, a chain cover is mounted on the front wall of the cylinder block 2. A drive sprocket mounted on the crankshaft 26, a timing chain wound around the drive sprocket, and a chain tensioner for giving a tension force to the timing chain are disposed within the chain cover.

Figure 3A:
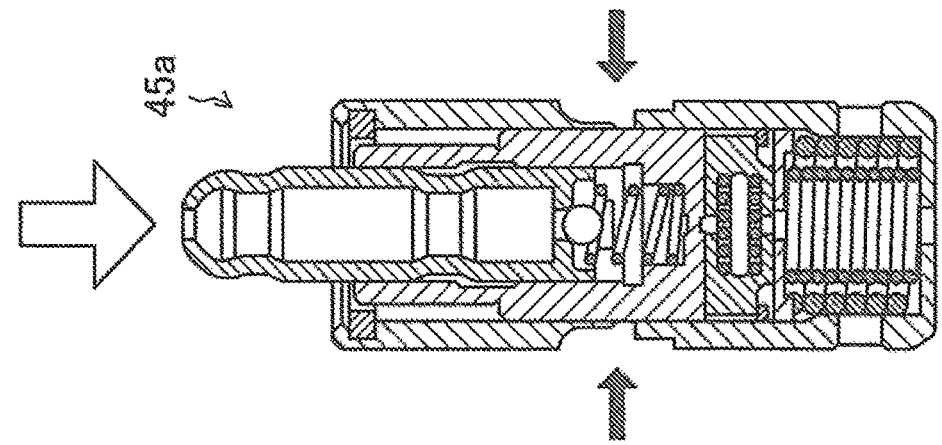
FIG. 3A is a sectional view illustrating a configuration and an operation of a hydraulically operated valve stop device in a locked state.
Figure 3B:
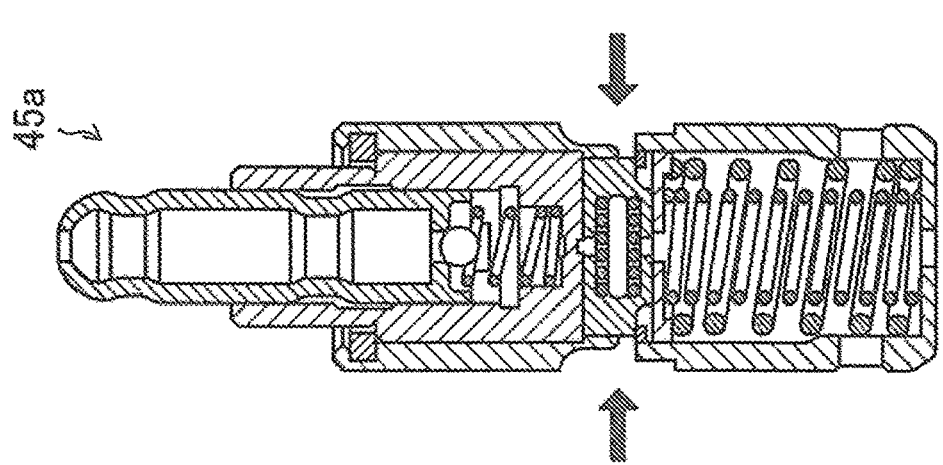
FIG. 3B is a sectional view illustrating a configuration and an operation of a hydraulically operated valve stop device in a lock released state.
Figure 3C:
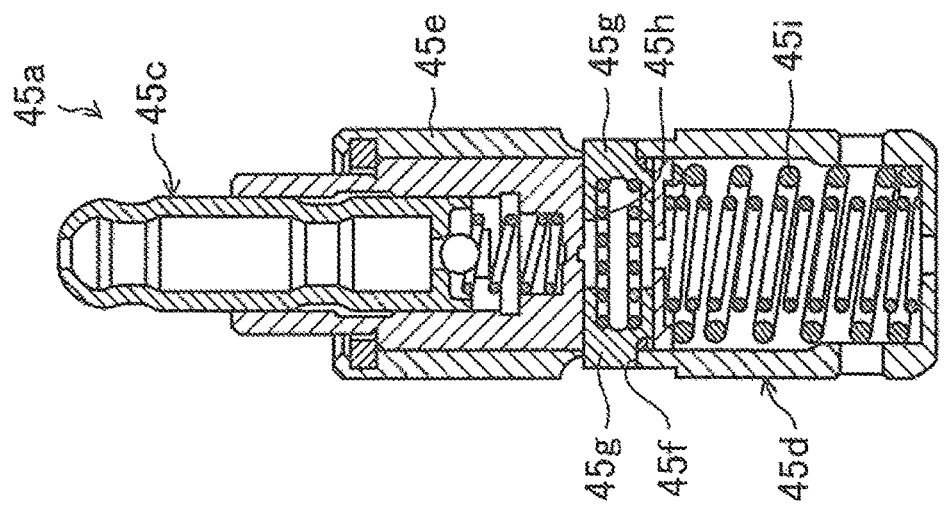
FIG. 3C is a sectional view illustrating a configuration and an operation of a hydraulically operated valve stop device in a state that an operation of a valve is stopped.

The HLAs 45*a* and 46*a* including a valve stop device are described in detail referring to FIGS. 3A, 3B, and 3C. Note that the configurations of the HLAs 45*a* and 46*a* are substantially the same. Therefore, in the following, only the configuration of the HLA 45*a* is described.

The HLA 45*a* includes a pivot mechanism 45*c* and a valve stop device 45*d*.

The pivot mechanism 45*c* is a well-known pivot mechanism for an HLA. The pivot mechanism 45*c* automatically adjusts the valve clearance to zero by a hydraulic pressure. Although the HLAs 45*b* and 46*b* do not include a valve stop device, the HLAs 45*b* and 46*b* include a pivot mechanism substantially the same as the pivot mechanism 45*c*.

The valve stop device 45*d* is a device for switching between activation and deactivation of an associated intake valve 13 or an associated exhaust valve 14. The valve stop device 45*d* includes an outer cylinder 45*e* having an end thereof opened and the other end thereof bottomed, and configured to axially and slidably accommodate the pivot mechanism 45*c*; a pair of lock pins 45*g* which are projectably and retractably received in two through-holes 45*f* formed in a lateral surface of the outer cylinder 45*e* while facing each other; a lock spring 45*h* which urges one of the lock pins 45*g* radially outwardly of the outer cylinder 45*e*; and a lost motion spring 45*i* disposed between the bottom of the outer cylinder 45*e* and the pivot mechanism 45*c*, and configured to urge the pivot mechanism 45*c* axially toward the opening of the outer cylinder 45*e*. The lock pins 45*g* are disposed at a lower end of the pivot mechanism 45*c*. The lock pins 45*g* are driven by a hydraulic pressure, and are switched between a state that the lock pins 45*g* are engaged in the through-holes 45*f*, and a state that the lock pins 45*g* are moved radially inwardly of the outer cylinder 45*e* and engagement with the through-holes 45*f* is released.

As illustrated in FIG. 3A, when the lock pins 45*g* are engaged in the through-holes 45*f*, the pivot mechanism 45*c* is projected from the outer cylinder 45*e* by a relatively large projection amount, and movement of the pivot mechanism 45*c* in the axis direction of the outer cylinder 45*e* is restricted by the lock pins 45*g*. In other words, the pivot mechanism 45*c* is in a locked state. In this state, the top portion of the pivot mechanism 45*c* comes into contact with an end of the swing arm 43 or an end of the swing arm 44, and functions as a pivot point of a swing operation. As a result, the swing arms 43 and 44 swing in such a manner as to move the intake valve 13 and the exhaust valve 14 by the other ends thereof in the opening direction against the urging forces of the valve springs 15 and 16. In other words, the valve stop device 45*d* activates an associated intake valve 13 or an associated exhaust valve 14 when the valve stop device 45*d* is in a locked state.

On the other hand, when a hydraulic pressure is applied to the lock pins 45*g* radially inwardly, as illustrated in FIG. 3B, the lock pins 45*g* are moved radially inwardly of the outer cylinder 45*e* against the urging force of the lock spring 45*h*, and engagement of the lock pins 45*g* with the through-holes 45*f* is released. As a result, a locked state of the pivot mechanism 45*c* is released.

Even when the pivot mechanism 45c is in a lock released state as described above, the pivot mechanism 45c is kept in a state that the pivot mechanism 45c is projected from the outer cylinder 45e by a relatively large projection amount by the urging force of the lost motion spring 45i. Note that movement of the pivot mechanism 45c in the axis direction of the outer cylinder 45e is not restricted, and the pivot mechanism 45c is movable. Further, the urging force of the lost motion spring 45i is set smaller than the urging force of the valve spring 15 or 16 for urging the intake valve 13 or the exhaust valve 14 in a closing direction. Therefore, when the cam followers 43a and 44a are respectively pushed by the cam portions 41a and 42a when the pivot mechanisms 45c are in a lock released state, the top portions of the intake valve 13 and the exhaust valve 14 serve as pivot points of swing operations of the swing arms 43 and 44. As illustrated in FIG. 3C, the swing arm 43 or 44 moves the pivot mechanism 45c to the bottom of the outer cylinder 45e against the urging force of the lost motion spring 45i. In other words, the valve stop device 45d stops activation of an associated intake valve 13 or an associated exhaust valve 14 when the pivot mechanism 45c is in a lock released state.

Figure 4:
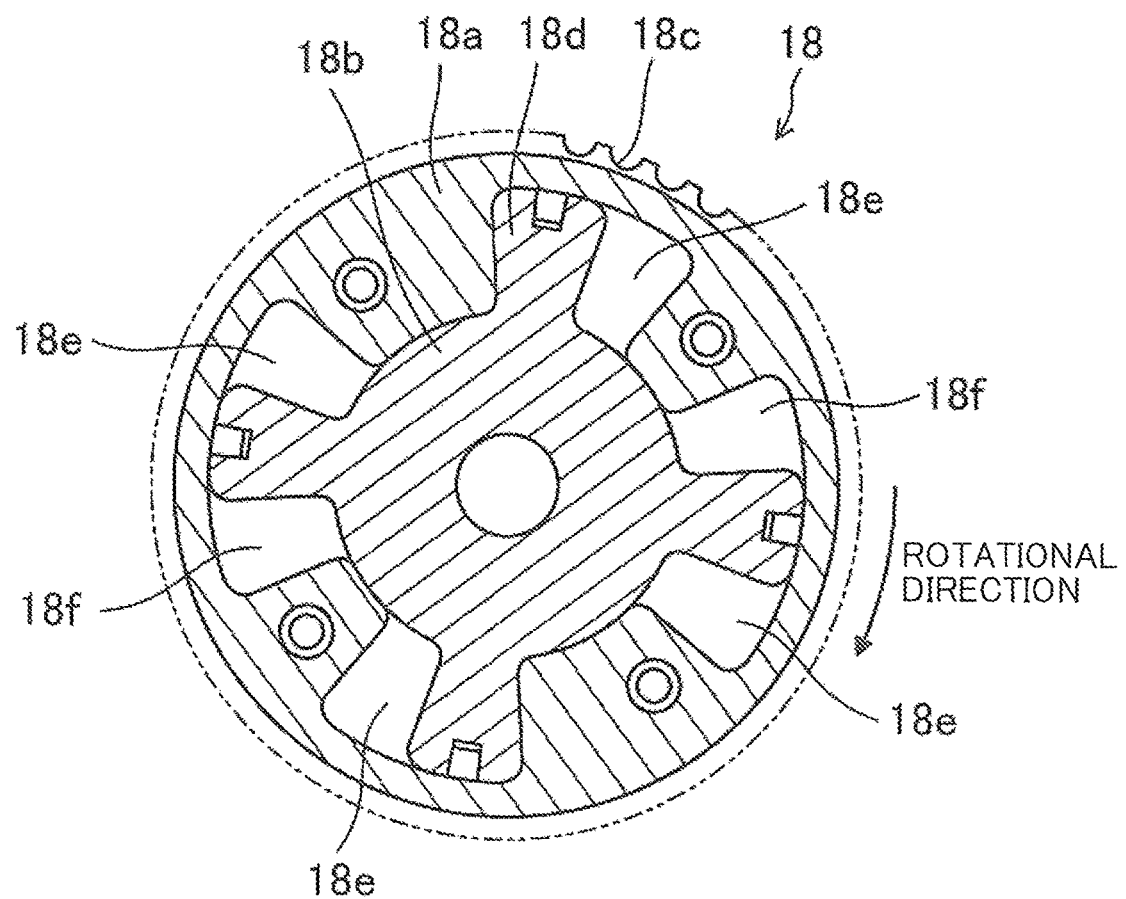
FIG. 4 is a sectional view illustrating a schematic configuration of a variable valve timing mechanism.

Next, the exhaust VVT mechanism 18 is described in detail referring to FIG. 4.

The exhaust VVT mechanism 18 includes a substantially annular housing 18a, and a rotor 18b accommodated within the housing 18a. The housing 18a is integrally and rotatably connected to a cam pulley 18c which rotates in synchronism with the crankshaft 26. The rotor 18b is integrally and rotatably connected to the camshaft 41 which opens and closes an associated intake valve 13. Vanes 18d in sliding contact with the inner surface of the housing 18a are formed on the rotor 18b. A plurality of retard angle hydraulic chambers 18e and a plurality of advance angle hydraulic chambers 18f which are defined by the inner surface of the housing 18a, the vanes 18d, and the main body of the rotor 18b are formed within the housing 18a. Oil is supplied to the retard angle hydraulic chambers 18e and to the advance angle hydraulic chambers 18f. When the hydraulic pressures of the retard angle hydraulic chambers 18e are high, the rotor 18b is rotated in a direction opposite to the rotational direction of the housing 18a. Specifically, the camshaft 41 is rotated in a direction opposite to the rotational direction of the cam pulley 18c, and the valve opening timing of the intake valve 13 is retarded. On the other hand, when the hydraulic pressures of the advance angle hydraulic chambers 18f are high, the rotor 18b is rotated in the same direction as the rotational direction of the housing 18a. Specifically, the camshaft 41 is rotated in the same direction as the rotational direction of the cam pulley 18c, and the valve opening timing of the intake valve 13 is advanced.

Figure 5:
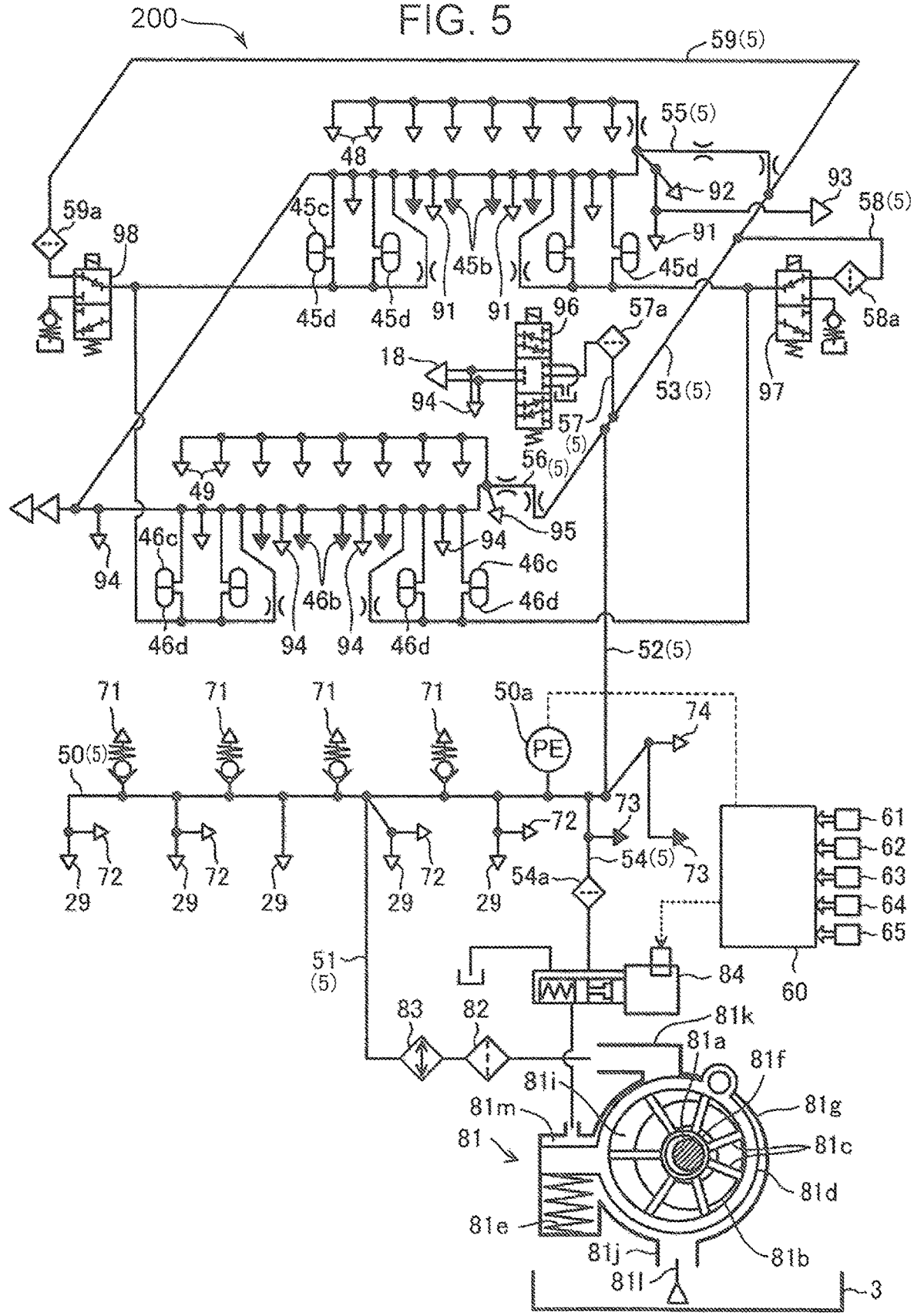
FIG. 5 is a hydraulic circuit diagram of an oil supply device.

Next, an oil supply device 200 is described referring to FIG. 5. FIG. 5 illustrates a hydraulic circuit diagram of the oil supply device 200.

The oil supply device 200 includes a variable capacity oil pump 81 which is driven to rotate by the crankshaft 26, and an oil supply passage 5 connected to the oil pump 81 for allowing oil to flow. The oil pump 81 is an auxiliary machine to be driven by the engine 100.

The oil pump 81 is a well-known variable capacity oil pump, and is driven by the crankshaft 26. The oil pump 81 is mounted on the lower surface of the lower block 22, and is accommodated within the oil pan 3. Specifically, the oil pump 81 includes a drive shaft 81a which is driven to rotate by the crankshaft 26, a rotor 81b connected to the drive shaft 81a, a plurality of vanes 81c configured to be radially projectable and retractable with respect to the rotor 81b, a cam ring 81d configured to accommodate the rotor 81b and the vanes 81c, and to adjust the eccentric amount of the cam ring 81d with respect to the center of rotation of the rotor 81b, a spring 81e which urges the cam ring 81d in such a direction as to increase the eccentric amount of the cam ring 81d with respect to the center of rotation of the rotor 81b, a ring member 81f disposed within the rotor 81b, and a housing 81g which accommodates the rotor 81b, the vanes 81c, the cam ring 81d, the spring 81e, and the ring member 81f.

Although the illustration is omitted, an end of the drive shaft 81a projects outwardly of the housing 81g, and a driven sprocket is connected to the end of the drive shaft 81a. The timing chain, which is wound around the drive sprocket of the crankshaft 26, is also wound around the driven sprocket. In this way, the rotor 81b is driven to rotate by the crankshaft 26 via the timing chain.

When the rotor 81b is rotated, each of the vanes 81c slides on the inner surface of the cam ring 81d. Thus, a pump chamber (hydraulic oil chamber) 81i is defined by the rotor 81b, each two adjacent vanes 81c, the cam ring 81d, and the housing 81g.

A suction port 81j for sucking oil into the pump chamber 81i is formed in the housing 81g, and a discharge port 81k for discharging oil from the pump chamber 81i is formed in the housing 81g. An oil strainer 811 is connected to the suction port 81j. The oil strainer 811 is immersed in oil stored in the oil pan 3. In other words, oil stored in the oil pan 3 is sucked into the pump chamber 81i through the suction port 81j via the oil strainer 811. On the other hand, the oil supply passage 5 is connected to the discharge port 81k. In other words, oil whose pressure is raised by the oil pump 81, is discharged to the oil supply passage 5 through the discharge port 81k.

The cam ring 81d is supported on the housing 81g in such a manner that the cam ring 81d swings around a predetermined pivot point. The spring 81e urges the cam ring 81d toward one side with respect to the pivot point. Further, a pressure chamber 81m is defined between the cam ring 81d and the housing 81g. The pressure chamber 81m is configured to receive oil from the outside. The hydraulic pressure of oil within the pressure chamber 81m is applied to the cam ring 81d. Thus, the cam ring 81d swings with a balance between the urging force of the spring 81e and the hydraulic pressure of the pressure chamber 81m, and the eccentric amount of the cam ring 81d with respect to the center of rotation of the rotor 81b is determined. The capacity of the oil pump 81 is changed according to the eccentric amount of the cam ring 81d, and the discharge amount of oil is changed accordingly.

The oil supply passage 5 is constituted by pipes, and flow channels formed in the cylinder head 1 and the cylinder block 2. The oil supply passage 5 includes a main gallery 50 extending in the cylinder block 2 in the cylinder array direction, a first communication passage 51 for connecting between the oil pump 81 and the main gallery 50, a second communication passage 52 extending from the main gallery 50 to the cylinder head 1, a third communication passage 53 extending in the cylinder head 1 substantially horizontally between the intake side and the exhaust side of the engine 100, a control oil supply passage 54 branched from the first communication passage 51, and first to fifth oil supply passages 55 to 59 branched from the third communication passage 53.

The first communication passage 51 is connected to the discharge port 81k of the oil pump 81. An oil filter 82 and an oil cooler 83 are provided in this order from the oil pump 81 side within the first communication passage 51. In other words, oil discharged from the oil pump 81 to the first communication passage 51 is filtrated by the oil filter 82. After the oil temperature of oil is adjusted by the oil cooler 83, the oil is allowed to flow into the main gallery 50.

To the main gallery 50 connected are oil jets 71 which inject oil to the back surfaces of the four pistons 24, the bearing metals 29 of the five bearing portions 28 which rotatably support the crankshaft 26, bearing metals 72 disposed on crank pins to which the four connecting rods 25 are rotatably connected, an oil supply portion 73 which supplies oil to a hydraulic chain tensioner, an oil jet 74 which injects oil to a timing chain, and a hydraulic pressure sensor 50a which detects a hydraulic pressure of oil flowing through the main gallery 50. The hydraulic pressure sensor 50a is an example of a hydraulic pressure detection device. Oil is constantly supplied to the main gallery 50. Each of the oil jets 71 includes a relief valve and a nozzle. When a hydraulic pressure equal to or larger than a predetermined value is supplied to the relief valve, the relief valve is opened, and oil is injected from the nozzle.

Further, the control oil supply passage 54 connected to the pressure chamber 81m of the oil pump 81 via an oil control valve 84 is branched from the main gallery 50. An oil filter 54a is provided in the control oil supply passage 54. Oil in the main gallery 50 passes through the control oil supply passage 54. After the hydraulic pressure of oil is adjusted by the oil control valve 84, the oil is allowed to flow into the pressure chamber 81m of the oil pump 81. In other words, the discharge amount of the oil pump 81 is changed by causing the oil control valve 84 to control the flow rate of oil to be supplied to the pressure chamber 81m.

The oil control valve 84 is a linear solenoid valve. The oil control valve 84 adjusts the flow rate of oil to be supplied to the pressure chamber 81m according to an input duty ratio.

The second communication passage 52 communicates between the main gallery 50 and the third communication passage 53. Oil flowing through the main gallery 50 is allowed to flow into the third communication passage 53 via the second communication passage 52. Oil flowing through the third communication passage 53 is distributed between the intake side and the exhaust side of the cylinder head 1 via the third communication passage 53.

The first oil supply passage 55 is connected to oil supply portions 91 for bearing metals which support cam journals of the intake camshaft 41, an oil supply portion 92 for a thrust bearing of the intake camshaft 41, the pivot mechanism 45c of the HLA 45a including a valve stop device, the HLA 45b without a valve stop device, the intake oil shower 48, and an oil supply portion 93 for a sliding portion of the intake VVT mechanism.

The second oil supply passage 56 is connected to oil supply portions 94 for bearing metals which support cam journals of the exhaust camshaft 42, an oil supply portion 95 for a thrust bearing of the exhaust camshaft 42, a pivot mechanism 46c of the HLA 46a including a valve stop device, the HLA 46b without a valve stop device, and the exhaust oil shower 49.

The third oil supply passage 57 is connected to the retard angle hydraulic chambers 81e and to the advance angle hydraulic chambers 18f of the exhaust VVT mechanism 18 via a first direction switching valve 96. Further, the third oil supply passage 57 is connected to the frontmost oil supply portion 94 of the oil supply portions 94 for bearing metals of the exhaust camshaft 42. An oil filter 57a is connected to the upstream portion of the first direction switching valve 96 in the third oil supply passage 57. The flow rate of oil to be supplied to the retard angle hydraulic chambers 18e and to the retard angle hydraulic chambers 18f is adjusted by the first direction switching valve 96.

The fourth oil supply passage 58 is connected to the valve stop device 45d of the HLA 45a including a valve stop device, and to a valve stop device 46d of the HLA46a including a valve stop device of the first cylinder via a second switching valve 97. An oil filter 58a is connected to the upstream portion of the second direction switching valve 97 in the fourth oil supply passage 58. Oil supply to the valve stop device 45d and to the valve stop device 46d of the first cylinder is controlled by the second direction switching valve 97.

The fifth oil supply passage 59 is connected to the valve stop device 45d of the HLA 45a including a valve stop device, and to a valve stop device 46d of the HLA46a including a valve stop device of the fourth cylinder via a third switching valve 98. An oil filter 59a is connected to the upstream portion of the third direction switching valve 98 in the fifth oil supply passage 59. Oil supply to the valve stop device 45d and to the valve stop device 46d of the fourth cylinder is controlled by the third direction switching valve 98.

Oil supplied to each part of the engine 100 is allowed to drop to the oil pan 3 through an unillustrated drain oil passage, and is refluxed by the oil pump 81.

The engine 100 is controlled by a controller 60. The controller 60 includes a processor and a memory. Detection results from various sensors which detect an operating condition of the engine 100 are input to the controller 60. For instance, the controller 60 is connected to the hydraulic pressure sensor 50a, a crank angle sensor 61 which detects a rotational angle of the crankshaft 26, an air flow sensor 62 which detects the amount of air to be sucked by the engine 100, an oil temperature sensor 63 (an example of a viscosity characteristics detection device), a cam angle sensor 64 which detects a rotational phase of each of the camshafts 41 and 42, and a water temperature sensor 65 which detects a temperature of cooling water of the engine 100. The controller 60 obtains an engine speed on the basis of a detection signal from the crank angle sensor 61, obtains an engine load on the basis of a detection signal from the air flow sensor 62, and obtains operating angles of the intake VVT mechanism and the exhaust VVT mechanism 18 on the basis of a detection signal from the cam angle sensor 64. The controller 60 is an example of a control device.

The controller 60 determines an operating condition of the engine 100 on the basis of various detection results, and controls the oil control valve 84, the first direction switching valve 96, the second direction switching valve 97, and the third direction switching valve 98 according to the determined operating condition.

An exemplary control of the controller 60 is a reduced-cylinder operation. The controller 60 switches the operation mode of the engine 100 between an all-cylinder operation in which combustion is performed by all the cylinders, and a reduced-cylinder operation in which combustion in a part of the cylinders is stopped, and combustion is performed by the remaining cylinders according to an operating condition of the engine 100.

Further, the controller 60 sets a highest required hydraulic pressure out of the required hydraulic pressures of hydraulically operated devices according to an operating condition of the engine 100 as a target hydraulic pressure, and causes the oil control valve 84 to perform feedback control of the discharge amount of the oil pump 81 in such a manner that an actual hydraulic pressure detected by the hydraulic pressure sensor 50a coincides with the target hydraulic pressure. An example of the feedback control is PID control. Examples of the hydraulically operated devices are the exhaust VVT mechanism 18, the valve stop devices 45d and 46d, and the oil jets 71.

Figure 6:
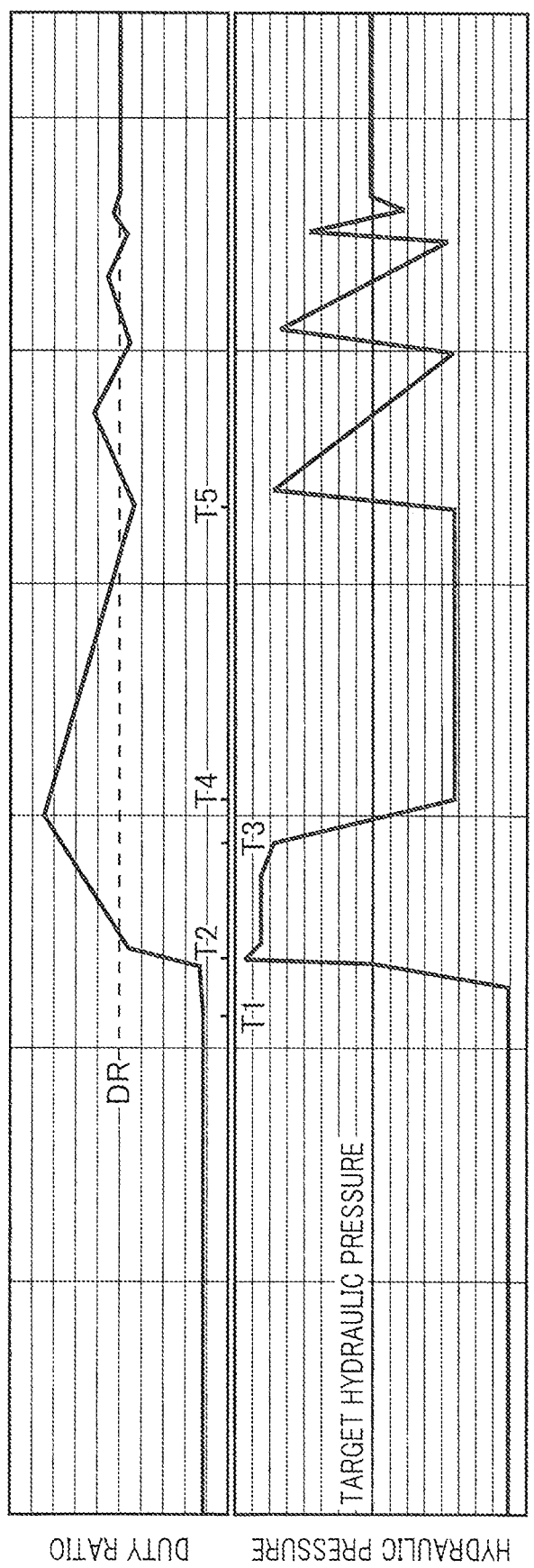
FIG. 6 is a graph illustrating a duty ratio and an actual hydraulic pressure with respect to a time when PID feedback control is performed when an engine is started in a cold state.

FIG. 6 is a graph illustrating a duty ratio and an actual hydraulic pressure with respect to a time when PID feedback control is performed at the time of start of the engine in a cold state. The upper diagram of FIG. 6 illustrates a graph of a duty ratio with respect to a time, wherein the vertical axis denotes a duty ratio, and the horizontal axis denotes a time. The lower diagram of FIG. 6 illustrates a graph of an actual hydraulic pressure with respect to a time, wherein the vertical axis denotes a hydraulic pressure, and the horizontal axis denotes a time. At the point of time T1, the engine 100 is started.

Note that the opening angle of the oil control valve 84 increases, as the duty ratio is increased. As the opening angle of the oil control valve 84 increases, the amount of oil flowing to the pressure chamber 81m of the oil pump 81 increases, and the eccentric amount of the cam ring 81d decreases. As a result, the discharge amount of oil from the oil pump 81 decreases, and the actual hydraulic pressure decreases.

Immediately after start of the engine 100, oil escapes from the oil supply passage 5. Therefore, oil also escapes from the pressure chamber 81m, and the pressure chamber 81m is in a reduced pressure state. In other words, at the point of time T1, the oil control valve 84 is in a state that the discharge amount of oil from the oil pump 81 is not adjustable. Therefore, at the point of time T1, the eccentric amount of the cam ring 81d is maximum without depending on the duty ratio of the oil control valve 84, and the oil pump 81 discharges oil with a maximum discharge amount. As a result, the actual hydraulic pressure sharply increases.

At the point of time T2, the actual hydraulic pressure remarkably exceeds the target hydraulic pressure. Therefore, the controller 60 increases the duty ratio in order to lower the actual hydraulic pressure. The main gallery 50 is located on the upstream side of the oil supply passage 5. Therefore, oil is immediately filled in the main gallery 50, and the hydraulic pressure sensor 50a detects a sharp change in the hydraulic pressure. On the other hand, the pressure chamber 81m is located on the downstream side of the main gallery 50. Therefore, even when the duty ratio is increased to increase the opening angle of the oil control valve 84, oil is not quickly filled in the pressure chamber 81m, and the oil pump 81 is in a state that the discharge amount of oil is not adjustable.

In view of the above, during a period of time from the point of time T2 to the point of time 13, the actual hydraulic pressure is kept at a high level, regardless that the duty ratio is increased. In this case, a difference between the target hydraulic pressure and the actual hydraulic pressure is integrated due to an influence of I (integration) term of PID control, and the duty ratio is excessively large, as compared with a target duty ratio DR. In this example, the target duty ratio DR indicates a duty ratio at which the actual hydraulic pressure is supposed to reach the target hydraulic pressure.

At the point of time T3, oil is finally filled within the entirety of the oil supply passage 5. Then, oil is supplied to the oil pressure chamber 81m via the oil control valve 84, and the oil pump 81 is brought to a state in which the discharge amount is adjustable. In this case, the actual hydraulic pressure is sharply lowered to a value remarkably below the target hydraulic pressure due to an influence of an excessively large duty ratio (at the point of time T4).

During a period of time from the point of time T4 to the point of time T5, the duty ratio is gradually lowered in order to raise the actual hydraulic pressure to the target hydraulic pressure. Note that if the gradient of the duty ratio is increased at the time of start of the engine 100 in a cold state, hydraulic pressure hunting occurs. In view of the above, the gradient is moderate as much as possible. As a result, the actual hydraulic pressure is kept at a low level.

Further, during a period of time from the point of time T4 to the point of time T5, the actual hydraulic pressure is greatly lowered below the target hydraulic pressure, and the discharge amount of the oil pump 81 decreases. As a result, the oil amount of the pressure chamber 81m is insufficient, and the oil pump 81 is brought to a state in which the discharge amount is not adjustable. Even in this condition, the actual hydraulic pressure is kept at a low level.

Figure 7:
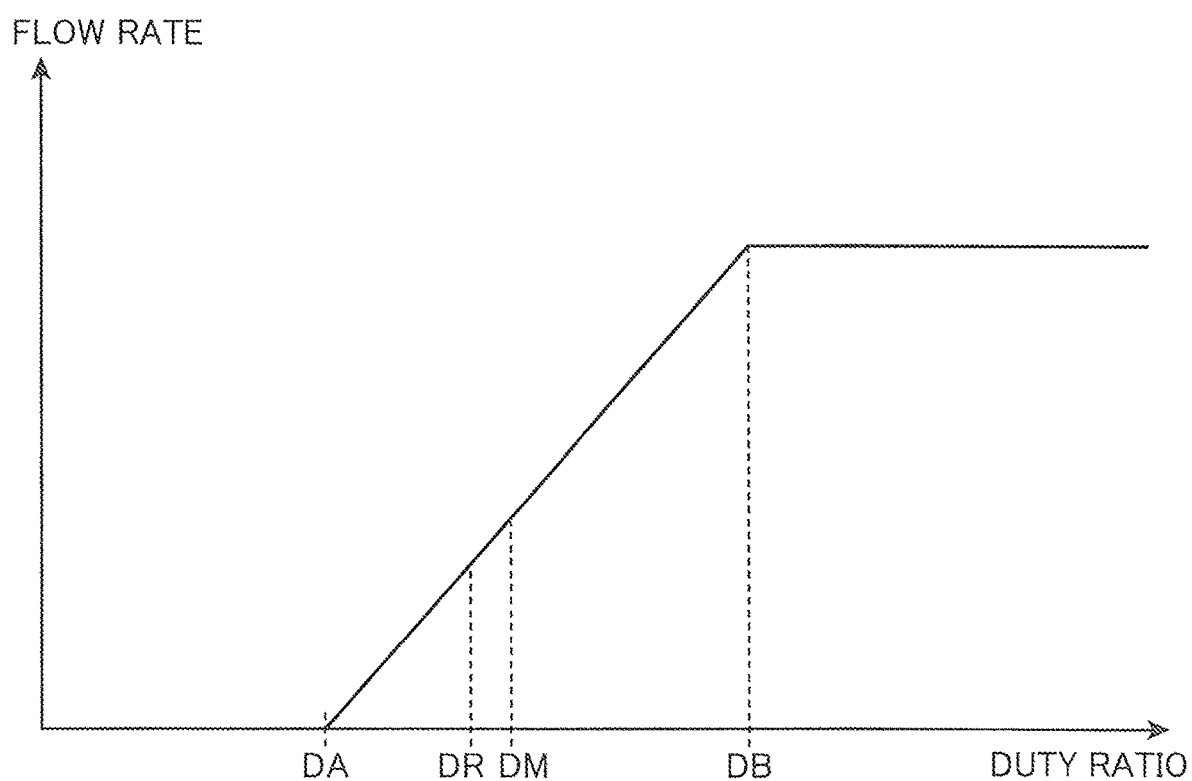
FIG. 7 is a graph illustrating characteristics of an oil control valve.

FIG. 7 is a graph illustrating characteristics of the oil control valve 84. The vertical axis denotes a flow rate of oil to be supplied from the oil control valve 84 to the pressure chamber 81m, and the horizontal axis denotes a duty ratio.

As illustrated in FIG. 7, when the duty ratio exceeds a duty ratio DA, the flow rate of oil starts to increase. Thereafter, as the duty ratio is increased, the flow rate of oil linearly increases. Then, when the duty ratio exceeds a duty ratio DB (>DA), the flow rate of oil is kept at a predetermined value.

In FIG. 7, the right-side region with respect to a boundary duty ratio DM indicates a non-sensitive zone in which the discharge amount of the oil pump 81 hardly changes even if the duty ratio is changed, and the left-side region with respect to the boundary duty ratio DM indicates a sensitive zone in which the discharge amount of the oil pump 81 changes depending on a duty ratio.

In other words, when the duty ratio exceeds the boundary duty ratio DM, the discharge amount of the oil pump 81 decreases. As a result, the oil amount of the pressure chamber 81m is insufficient, and the oil pump 81 is incapable of adjusting the discharge amount. On the other hand, when the duty ratio is lowered below the boundary duty ratio DM, a sufficient amount of oil is supplied to the pressure chamber 81m by the oil to be discharged from the oil pump 81, and the oil pump 81 is capable of adjusting the discharge amount. Note that the target duty ratio DR is slightly lower than the boundary duty ratio DM in terms of duty ratio.

During a period of time from the point of time T4 to the point of time T5 in FIG. 6, the oil pump 81 is controlled in the non-sensitive zone of the graph of FIG. 7. Therefore, during this period of time, the actual hydraulic pressure hardly rises even if the duty ratio is decreased.

Referring back to FIG. 6, at the point of time T5, the duty ratio finally enters the sensitive zone. Therefore, the actual hydraulic pressure changes. However, since the duty ratio is lower than the target duty ratio DR, the actual hydraulic pressure sharply increases to a value remarkably higher than the target hydraulic pressure. In view of the above, at the point of time T5, an increase in the duty ratio is started in order to lower the actual hydraulic pressure to the target hydraulic pressure.

Thereafter, the actual hydraulic pressure repeats the hunting with respect to the target hydraulic pressure, and gradually approaches the target hydraulic pressure.

After the point of time T5, the actual hydraulic pressure does not quickly reach the target hydraulic pressure for the following reason. Specifically, when the engine 100 is started in a cold state, the viscosity of oil is high. Therefore, a pressure loss by the oil supply passage 5 is high, and it takes a long time to repeat a series of cycles: adjusting a duty ratio, operating the oil control valve 84, supplying oil to the pressure chamber 81*m*, operating the oil pump 81, changing the discharge amount of oil, sensing by the hydraulic pressure sensor 50*a*, and re-adjusting a duty ratio.

In view of the above, as far as the oil temperature of oil is equal to or lower than a reference oil temperature, the controller 60 executes feedback control after executing fixed duty control (an example of fixed value control) in which the duty ratio (an example of a control value) of the oil control valve 84 is set to a fixed duty ratio (an example of a fixed control value) during a predetermined period of time from start of the engine 100. In the embodiment, it is possible to eliminate integration of a difference in I term by PID control during a predetermined period of time from start of the engine 100, and to shorten the period of time from the point of time T1 to the point of time T5 in FIG. 6.

Figure 8:
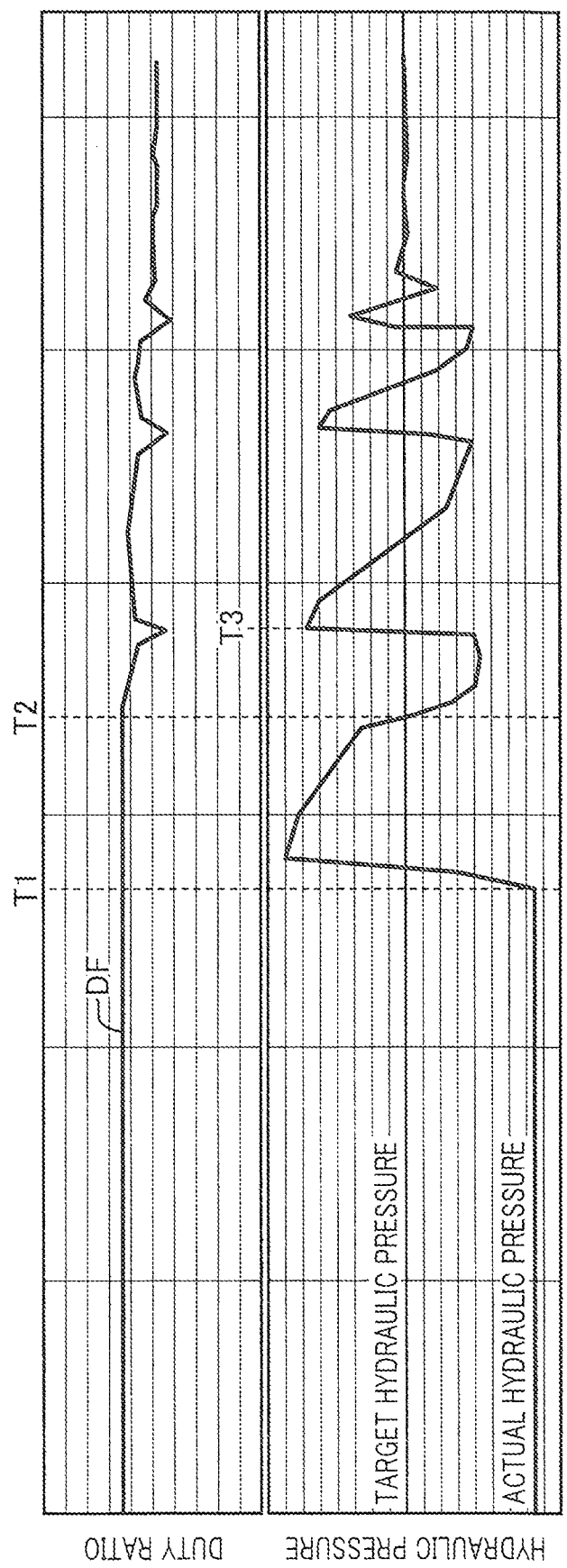
FIG. 8 is a graph illustrating a duty ratio and an actual hydraulic pressure with respect to a time when fixed duty ratio control is performed when an engine is started in a cold state.

FIG. 8 is a graph illustrating a duty ratio and an actual hydraulic pressure with respect to a time when fixed duty control is performed at the time of start of the engine in a cold state. The upper diagram of FIG. 8 illustrates a graph of a duty ratio with respect to a time, wherein the vertical axis denotes a duty ratio and a horizontal axis denotes a time. The lower diagram of FIG. 8 illustrates a graph of an actual hydraulic pressure with respect to a time, wherein the vertical axis denotes a hydraulic pressure, and a horizontal axis denotes a time.

At the point of time T1, the engine 100 is started. In this case, the duty ratio is set to a fixed duty ratio DF, and fixed duty control is started. Immediately after the engine 100 is started, oil escapes from the oil supply passage 5, and a sufficient amount of oil is not supplied to the pressure chamber 81*m*. Therefore, as well as FIG. 6, the oil pump 81 discharges oil with a maximum discharge amount. As a result, the actual hydraulic pressure sharply increases. Thereafter, during a period of time until the point of time T2 when fixed duty control is terminated, the actual hydraulic pressure is changed in the same manner as the period of time from the point of time T1 to the point of time T2 in FIG. 6.

At the point of time T2 when the actual hydraulic pressure is lowered to the target hydraulic pressure, the controller 60 terminates fixed duty control, and starts feedback control.

During a period of time from the point of time T2 to the point of time T3, the actual hydraulic pressure is lowered below the target hydraulic pressure. Therefore, the duty ratio is gradually decreased in order to raise the actual hydraulic pressure. However, the discharge amount of the oil pump 81 is also lowered due to a decrease in the actual hydraulic pressure, and the oil amount of the pressure chamber 81*m* is insufficient. Therefore, for a certain period of time, the actual hydraulic pressure is kept at a low level.

However, in FIG. 8, during a period of time from the point of time T1 to the point of time T2, the controller 60 sets the duty ratio of the oil control valve 84 to the fixed duty ratio DF. Therefore, during this period of time, a difference between the target hydraulic pressure and the actual hydraulic pressure is not integrated. At the point of time T2 when feedback control is started, the duty ratio is not excessively large, as compared with the target duty ratio DR associated with the target hydraulic pressure when feedback control is started. Therefore, unlike the case of FIG. 6, the actual hydraulic pressure is not remarkably lowered below the target hydraulic pressure, and the oil pump 81 is immediately brought to a state in which the discharge amount of oil is adjustable (at the point of time T3). Thereafter, the behavior of the actual hydraulic pressure is the same as the behavior after the point of time T5 in FIG. 6 by feedback control, and the actual hydraulic pressure reaches the target hydraulic pressure.

In this way, in the embodiment, when the engine 100 is started in a cold state, feedback control is not performed, and fixed duty control is performed. Therefore, it is possible to shorten the period of time from the point of time T1 to the point of time T5 in FIG. 6 to the period of time from the point of time T1 to the point of time T3, and to speedily cause the actual hydraulic pressure to reach the target hydraulic pressure.

Figure 9:
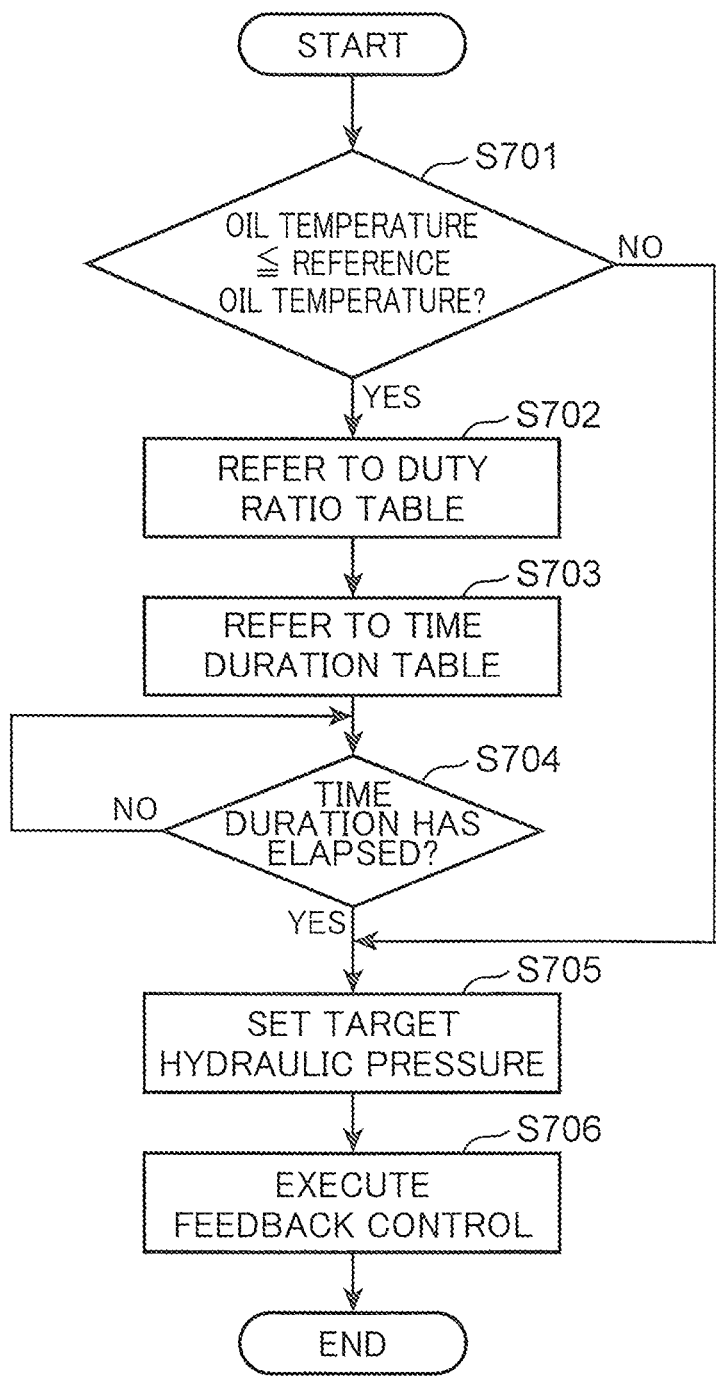
FIG. 9 is a flowchart illustrating an example of an operation of an oil supply device in an embodiment of the present invention.

FIG. 9 is a flowchart illustrating an example of an operation of the oil supply device 200 in the embodiment of the present invention. First of all, the controller 60 determines whether or not the oil temperature of oil detected by the oil temperature sensor 63 is equal to or lower than a reference oil temperature (S701). The reference oil temperature may be a temperature, which makes it possible to shorten a period of time until the actual hydraulic pressure reaches the target hydraulic pressure by performing fixed duty control, as compared with a case in which feedback control is performed. Specifically, the reference oil temperature may be 0° C. This is merely an example. The reference oil temperature may be set to any value depending on the type of oil.

Oil has a physical property that the viscosity increases as the oil temperature lowers. Therefore, it is possible to specify the viscosity of oil by measuring an oil temperature. In view of the above, in the embodiment, an oil temperature is used as viscosity characteristics of oil.

In this example, an oil temperature is measured with use of the oil temperature sensor 63. This is merely an example. For instance, the controller 60 may estimate an oil temperature from the temperature of cooling water of the engine 100 or from the ambient temperature, and the estimated oil temperature may be compared with a reference oil temperature.

Next, the controller 60 determines a fixed duty ratio associated with an oil temperature referring to a fixed duty ratio table.

The upper diagram of FIG. 10 is a diagram illustrating an example of a fixed duty ratio table T101. The fixed duty ratio table T101 stores oil temperatures and fixed duty ratios in association with each other. In the example of the upper diagram of FIG. 10, five fixed duty ratios D0, D1, D2, D3, and D4 are stored in association with five oil temperatures −40° C., −30° C., −20° C., −10° C., and 0° C.

In this example, a fixed duty ratio is set to a value which satisfies a requirement that the actual hydraulic pressure does not exceed a predetermined upper limit hydraulic pressure when the oil control valve 84 is constituted by an element having a maximum variation out of variations on characteristics of elements constituting the oil control valve 84. In this example, the oil control valve 84 is constituted by a linear solenoid valve. Therefore, examples of the elements constituting the oil control valve 84 are electrical circuit elements such as a resistance and a coil.

The predetermined upper limit hydraulic pressure may be a value such that if the hydraulic pressure exceeds the value, the oil supply device 200 may be damaged or broken, oil may leak, noise may be generated from the oil pump 81, oil may be injected from the oil jets 71, the engine 100 may be cooled by the oil, and combustion stability of the engine 100 may be lowered.

Further, when a fixed duty ratio is approximate to a target duty ratio associated with a target hydraulic pressure at the time of start of feedback control, it is possible to speedily shift the control from fixed duty control to feedback control.

In view of the above, in the upper diagram of FIG. 10, the fixed duty ratio is set to a value equal to or approximate to a target duty ratio associated with a required hydraulic pressure of a hydraulically operated device at the time of start of feedback control in the aforementioned condition. Specifically, when a target duty ratio is input to the oil control valve 84 constituted by an element having a maximum variation, and when the actual hydraulic pressure exceeds the upper limit hydraulic pressure, the fixed duty ratio is set to a value larger than the target duty ratio in order to lower the actual hydraulic pressure to the upper limit hydraulic pressure. On the other hand, when a target duty ratio is input to the oil control valve 84 constituted by an element having a maximum variation, and when the actual hydraulic pressure does not exceed the upper limit hydraulic pressure, the fixed duty ratio is set to the target duty ratio.

Note that when the engine 100 is started, it is assumed that the exhaust VVT mechanism 18 is operated in an early stage out of the hydraulically operated devices, and the required hydraulic pressure of the exhaust VVT mechanism 18 becomes highest. In view of the above, a required hydraulic pressure of the exhaust VVT mechanism 18 is employed as the required hydraulic pressure.

In the upper diagram of FIG. 10, as the oil temperature increases, the fixed duty ratio is increased, and the discharge amount of oil from the oil pump 81 is lowered. This is because as the oil temperature increases, the viscosity of oil lowers, and oil responsiveness improves. In other words, when the oil temperature is high, it is possible to cause an actual hydraulic pressure to reach a target hydraulic pressure even if the discharge amount of oil from the oil pump 81 is decreased, as compared with a case in which the oil temperature is low.

Note that regarding oil temperatures that are not directly written in the fixed duty ratio table T101, the controller 60 may calculate fixed duty ratios of the oil temperatures by linearly interpolating fixed duty ratios of oil temperatures before and after the oil temperatures written in the fixed duty ratio table T101.

Referring back to FIG. 9, in Step S703, the controller 60 determines a time duration associated with an oil temperature referring to a time duration table.

The lower diagram of FIG. 10 is a diagram illustrating an example of a time duration table T102. The time duration table T102 stores oil temperatures and time durations in association with each other. The time durations are periods of time when fixed duty control is executed.

In the example of the lower diagram of FIG. 10, five time durations T0, T1, T2, T3, and T4 are stored in association with five oil temperatures −40° C., −30° C., −20° C., −10° C., and 0° C. The time durations T0 to T4 are set to a smaller value, as the oil temperature increases. This is because it is possible to cause an actual hydraulic pressure to reach a target hydraulic pressure within a short period of time in view of that oil responsiveness increases as the oil temperature increases.

Referring back to FIG. 9, in Step S704, the controller 60 determines whether or not the time duration determined in Step S703 has elapsed. When the time duration has not elapsed (NO in Step S704), the process waits. On the other hand, when the time duration has elapsed (YES in Step S704), the process proceeds to Step S705. Thus, fixed duty control is executed until the time duration elapses.

In Step S705, the controller 60 sets a target hydraulic pressure. In this example, the controller 60 sets a required hydraulic pressure of a hydraulically operated device, whose required hydraulic pressure is currently maximum out of the hydraulically operated devices, as a target hydraulic pressure. When the engine 100 is started in a cold state, it is assumed that the target hydraulic pressure of the exhaust VVT mechanism 18 is maximum. Therefore, the required hydraulic pressure of the exhaust VVT mechanism 18 is set as a target hydraulic pressure.

FIG. 11 is a diagram illustrating an example of a required hydraulic pressure table T601 indicating required hydraulic pressures of the exhaust VVT mechanism 18. The required hydraulic table T601 stores required hydraulic pressures of the exhaust VVT mechanism 18 in association with oil temperatures and rotational speeds of the engine 100. In FIG. 11, Tc1, Tc2, and Tc3 indicate oil temperatures, and 500, 1,000, 1,500, 2,000, 3,000, 4,000, 5,000, and 6,000 indicate rotational speeds of the engine 100. Specifically, the controller 60 reads, from the required hydraulic pressure table T601, a required hydraulic pressure associated with a current oil temperature and a current rotational speed of the engine 100, and sets the read required hydraulic pressure as a target hydraulic pressure.

In this example, the controller 60 stores required hydraulic pressure tables regarding the hydraulically operated devices other than the exhaust VVT mechanism 18 (such as the valve stop devices 45*d* and 46*d*, and the oil jets 71) in the same manner as the required hydraulic pressure table of FIG. 11; and reads a required hydraulic pressure of each of the hydraulically operated devices, which is associated with a current operating condition of the engine 100, from each of the required hydraulic pressure tables. Then, the controller 60 sets a maximum required hydraulic pressure out of the required hydraulic pressures read from the required hydraulic pressure tables associated with all the hydraulically operated devices, as a target hydraulic pressure.

Referring back to FIG. 9, in Step S706, the controller 60 performs feedback control in such a manner that the target hydraulic pressure set in Step S705 coincides with the actual hydraulic pressure detected by the hydraulic pressure sensor 50*a*. Thereafter, the controller 60 periodically detects an operating condition of the engine 100 until the engine 100 is stopped, and sets a maximum required hydraulic pressure out of the required hydraulic pressures required by the hydraulically operated devices in a detected state, as a target hydraulic pressure for feedback control.

In this way, according to the oil supply device 200 in the embodiment, fixed duty control of setting a duty ratio of the oil control valve 84 to a fixed duty ratio during a predetermined period of time from start of the engine 100 in a cold state is executed. This makes it possible to eliminate integration of a duty ratio in I term when PID feedback control is performed, and to speedily cause an actual hydraulic pressure to reach a target hydraulic pressure even when the engine 100 is started in a cold state in which the oil viscosity is high. Thus, it is possible to perform stable control of hydraulically operated devices in an early stage.

(Modifications)

(1) In the flowchart of FIG. 9, fixed duty control is executed when the oil temperature is equal to or lower than a reference oil temperature. The present invention, however, is not limited to the above. For instance, as far as it is clear that a vehicle incorporated with the inventive oil supply device is used in a low temperature district, fixed duty control may be executed without any conditions when the engine 100 is started.

(2) In the embodiment, viscosity characteristics of oil are detected with use of the oil temperature sensor 63. The present invention, however, is not limited to the above. For instance, viscosity characteristics of oil may be detected with use of a viscosity sensor capable of directly detecting a viscosity of oil. In this case, in Step S701 of FIG. 9, the controller 60 may execute fixed duty control when the viscosity of oil detected by a viscosity sensor is higher than a reference viscosity.

The following is a summary of the embodiment.

An oil supply device for an engine according to an aspect of the present invention includes a variable capacity oil pump; a hydraulically operated device connected to the oil pump via an oil supply passage; a hydraulic pressure detection device which detects a hydraulic pressure of the oil supply passage; an oil control valve which controls a flow rate of oil to be supplied to a pressure chamber of the oil pump to change a discharge amount of oil to be discharged from the oil pump; and a control device which sets a target hydraulic pressure from a required hydraulic pressure of the hydraulically operated device according to an operating condition of the engine, and causes the oil control valve to perform feedback control of the discharge amount of the oil pump in such a manner that an actual hydraulic pressure detected by the hydraulic pressure detection device coincides with the target hydraulic pressure. The control device executes the feedback control after executing fixed value control of setting a control value of the oil control valve to a fixed control value during a predetermined period of time from start of the engine.

According to the aforementioned configuration, fixed value control of setting a control value of the oil control valve to a fixed control value is executed during a predetermined period of time from start of the engine. Therefore, even when the engine is started in a cold state in which the oil viscosity is high, it is possible to eliminate integration of a control value in I term, which is required when PID feedback control is performed, and to cause the actual hydraulic pressure to speedily reach the target hydraulic pressure. This is advantageous in performing stable control of a hydraulically operated device in an early stage.

The oil supply device having the aforementioned configuration may further include a viscosity characteristics detection device which detects viscosity characteristics of the oil. The control device may set the fixed control value large, as a viscosity indicated by the viscosity characteristics detected by the viscosity characteristics detection device decreases.

According to the aforementioned configuration, the fixed control value is set large, as the viscosity indicated by viscosity characteristics of oil decreases. This is advantageous in causing the actual hydraulic pressure to speedily reach the target hydraulic pressure, taking into consideration viscosity characteristics of oil from start of the engine.

The oil supply device having the aforementioned configuration may further include a viscosity characteristics detection device which detects viscosity characteristics of the oil. The control device may set the predetermined period of time short, as a viscosity indicated by the viscosity characteristics detected by the viscosity characteristics detection device decreases.

According to the aforementioned configuration, the period of time when fixed value control is executed is set short, as the viscosity indicated by viscosity characteristics of oil decreases. This is advantageous in causing the actual hydraulic pressure to speedily reach the target hydraulic pressure, taking into consideration viscosity characteristics of oil from start of the engine.

In the aforementioned configuration, the fixed control value may be set to a value equal to or approximate to a control value associated with a required hydraulic pressure of the hydraulically operated device at the time of start of the feedback control in a condition that the actual hydraulic pressure does not exceed a predetermined upper limit hydraulic pressure when the oil control valve is constituted by an element having a maximum variation out of variations on characteristics of elements constituting the oil control valve.

According to the aforementioned configuration, the fixed control value is set to a value equal to or approximate to a control value associated with a required hydraulic pressure of a hydraulically operated device when feedback control is started. This makes it possible to shift the control from fixed value control to feedback control in an early stage. Further, the fixed control value satisfies a requirement that the actual hydraulic pressure does not exceed the predetermined upper limit hydraulic pressure when the oil control valve is constituted by an element having a maximum variation out of variations on characteristics of elements constituting the oil control valve. Therefore, it is possible to implement a configuration, in which the actual hydraulic pressure does not exceed the upper limit hydraulic pressure, reliability of the oil supply device is secured, and noise due to an oil pump is suppressed in fixed value control. Further, since the actual hydraulic pressure does not exceed the upper limit hydraulic pressure, it is possible to prevent cooling of the engine by injection of oil from an hydraulically operated device such as an oil jet, and to suppress lowering of combustion stability of the engine.

The oil supply device having the aforementioned configuration may further include a viscosity characteristics detection device which detects viscosity characteristics of the oil. The control device may execute the fixed value control when a viscosity detected by the viscosity characteristics detection device is higher than a predetermined viscosity.

According to the aforementioned configuration, only when the viscosity detected by the viscosity characteristics detection device is higher than a predetermined viscosity, fixed value control is executed. This makes it possible to prevent execution of fixed value control when the viscosity is lower than the predetermined viscosity. This is advantageous in preventing an increase in time required for the actual hydraulic pressure to reach the target hydraulic pressure.

This application is based on Japanese Patent Application No. 2016-009412 filed in Japan Patent Office on Jan. 21, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. An oil supply device for an engine, comprising:
a variable capacity oil pump;
a hydraulically operated device connected to the oil pump via an oil supply passage;
a pressure sensor which detects a hydraulic pressure of the oil supply passage;

an oil control valve which controls a flow rate of oil to be supplied to a pressure chamber of the oil pump to change a discharge amount of oil to be discharged from the oil pump; and a controller which sets a target hydraulic pressure from a required hydraulic pressure of the hydraulically operated device according to an operating condition of the engine, and causes the oil control valve to perform feedback control of the discharge amount of the oil pump in such a manner that an actual hydraulic pressure detected by the pressure sensor coincides with the target hydraulic pressure, wherein the controller executes the feedback control after executing fixed value control of setting a control value of the oil control valve to a fixed control value during a predetermined period of time from start of the engine, and the fixed control value is set to a value equal to or approximate to a control value associated with a required hydraulic pressure necessary to operate the hydraulically operated device at the time of start of the feedback control, the fixed control value satisfies a condition that the actual hydraulic pressure does not exceed a predetermined upper limit hydraulic pressure when the oil control valve is constituted by an element having a maximum variation out of variations on characteristics of elements constituting the oil control valve.

2. The oil supply device for the engine according to claim 1, further comprising:

an oil temperature sensor which detects viscosity characteristics of the oil, wherein the controller sets the fixed control value large, as a viscosity indicated by the viscosity characteristics detected by the oil temperature sensor decreases.

3. The oil supply device for the engine according to claim 1, further comprising:

an oil temperature sensor which detects viscosity characteristics of the oil, wherein the controller sets the predetermined period of time short, as a viscosity indicated by the viscosity characteristics detected by the oil temperature sensor decreases.

4. The oil supply device for the engine according to claim 1, further comprising:

an oil temperature sensor which detects viscosity characteristics of the oil, wherein the controller executes the fixed value control when a viscosity detected by the oil temperature sensor is higher than a predetermined viscosity.

* * * * *